United States Patent [19]

Kurr et al.

[11] 4,195,197

[45] Mar. 25, 1980

[54] CORROSION RESISTANT URD CABLE

[75] Inventors: George W. Kurr, Fair Lawn; Michael Myers, Westfield, both of N.J.

[73] Assignee: Federated Metals Corporation, New York, N.Y.

[21] Appl. No.: 958,755

[22] Filed: Nov. 8, 1978

[51] Int. Cl.² ........................ H01R 3/06; H01R 5/04
[52] U.S. Cl. .................................. 174/78; 164/108; 204/148; 204/197; 307/95; 403/269
[58] Field of Search ............... 174/78, 71 R; 307/95; 204/147, 148, 196, 197; 403/269; 29/630 F; 164/98, 108

[56] References Cited

U.S. PATENT DOCUMENTS

| 4,028,487 | 6/1977 | McLean | 174/78 |
| 4,080,024 | 3/1978 | Kroon | 174/78 X |
| 4,090,767 | 5/1978 | Tregoning | 164/98 X |
| 4,091,291 | 5/1978 | Foster et al. | 307/95 |

FOREIGN PATENT DOCUMENTS 94562   9/1969   France ........................ 174/78

*Primary Examiner*—Roy N. Envall, Jr.
*Attorney, Agent, or Firm*—Roger J. Drew

[57] ABSTRACT

A method of providing a secure, long-lasting electrical connection between the concentric neutral wires of a Underground Residential Distribution (URD) cable and a sacrificial anode. The invention provides for the prevention of corrosion of the neutral wires of the URD cable. The method comprises: securing a mold around the URD cable and the concentric neutral wires over the area of contact with the anode connecting wire; pouring a low-melt alloy into the mold to surround the URD cable so as to contact at least 50% of the surface area of each of the neutral wires and the anode connecting wire in the area of contact; and cooling the low-melt alloy to form a solid casting around the concentric neutral wires and the area of contact with the anode connecting wire, whereby a secure, long-lasting electrical connection is provided between the neutral wires and the anode.

20 Claims, 5 Drawing Figures

CORROSION RESISTANT URD CABLE

BACKGROUND OF THE INVENTION

This invention is related to URD cables, and more particularly to a Underground Residential Distribution (URD) cable where the concentric neutral wires thereof are maintained in a secure electrical connection with a sacrificial anode. The invention also provides a means of preventing corrosion of the neutral wires or URD cable that has been installed underground.

In the present day use of the cable, under certain exposure conditions, corrosion may occur and damage the "tinned" copper concentric neutral wires of Underground Residential Distribution (URD) power cable. The damage can be severe and can develop at a very early date after the URD cables have been installed underground.

The problem is of utmost concern because there have been substantial amounts of cable already buried and greater amounts are scheduled for installation in the future.

The corrosion of the neutral wires may appear as concentrated pitting or the wires may corrode to pencil-point shapes. Sometimes the damage is uniform causing strands to be brittle and crumble at touch. The corroded neutral wires are usually covered with green corrosion products (i.e. oxidized metals). When the wires are first exposed there are active corrosion pits which are filled with a bright red liquid. Shortly after exposure to air this liquid changes to a red-brick color.

It is both impracticable and impossible to attempt to expose every meter of URD cable when looking for corrosion of neutral wires. Fortunately, such as undertaking is not necessary as part of the corrosion process, all metals undergo a change in electrical potential which is measurable and, through experience, is somewhat indicative of physical condition. The corrosion protection as provided by the present invention as well as other means take advantage of the corrosion process itself. When two different metals are buried in the same soil and electrically connected to one another, a corrosion ("galvanic") cell is formed and corrosion current flows, causing the more active metal to be an anode and corrode and the less active or more noble metal to be a cathode and be protected. Sacrificial anodes of zinc or magnesium are generally used for the cathodic protection of the neutral wires.

Up to the present time, several different ways have been used to provide a long-lasting connection between the concentric neutral wires and the anode. However, none of these methods have been efficient or effective. One way which has been used is by use of a mechanical clamp. By this means, a clamp is placed and secured around a corroded area of the neutral wires to provide a contact (i.e. an electrical connection between the neutral wires and the anode connecting wire of the sacrificial anodes). According to this means, the clamp because of its metal fabrication serves as the connection between the concentric neutral wires and the anode connecting wire. That is, the connection wire which makes contact with the anode also makes contact with the common clamp while it is in contact with the neutral wires. This method may seem practical but the clamps have not been effective or beneficial in solving this problem since they will not maintain a low electrical resistance connection for a long period of time.

In another method as described in U.S. Pat. No. 4,080,024 issued to D. H. Kroon, a sheet or sleeve has been used which is placed around the cable where the connection is made between the neutral wires and the connecting wire of the sacrificial anode. This contact or connection is tangential to the neutral wires and is difficult to be maintained over a period of time. Although, this connection means is effective at first, it may become less and less effective with time.

The problems which have accompanied the neutral wires of the URD cable are fully resolved by the means provided by the present invention as described below.

SUMMARY OF THE INVENTION

The present invention overcomes the problem of corroding concentric neutral wires of a URD cable and provides a secure, long-lasting electrical connection between the neutral wires and the connecting wire of a sacrificial anode and thus, the anode. According to the present invention, the method for providing a secure, long-lasting electrical connection between the concentric neutral wires of a URD cable and a sacrificial anode comprises:

(a) securing a mold around said URD cable and said concentric neutral wires over said area of contact with said anode connecting wire;

(b) pouring a low-melt alloy into said mold to surround the URD cable so as to contact at least 50% of the surface area of each of said concentric neutral wires and said anode connecting wire in said area of contact; and (c) cooling said low-melt alloy to form a solid casting around said concentric neutral wires and the area of contact with said anode connecting wire whereby a secure, long-lasting electrical connection is provided between said neutral wires and said anode.

DESCRIPTION OF DRAWINGS

The present invention will be more fully understood with the following description of the preferred embodiments when taken in consideration with the drawings which form a part hereof. The figures are.

DESCRIPTION OF THE PREFERRED EMBODIMENTS

Figure 1:
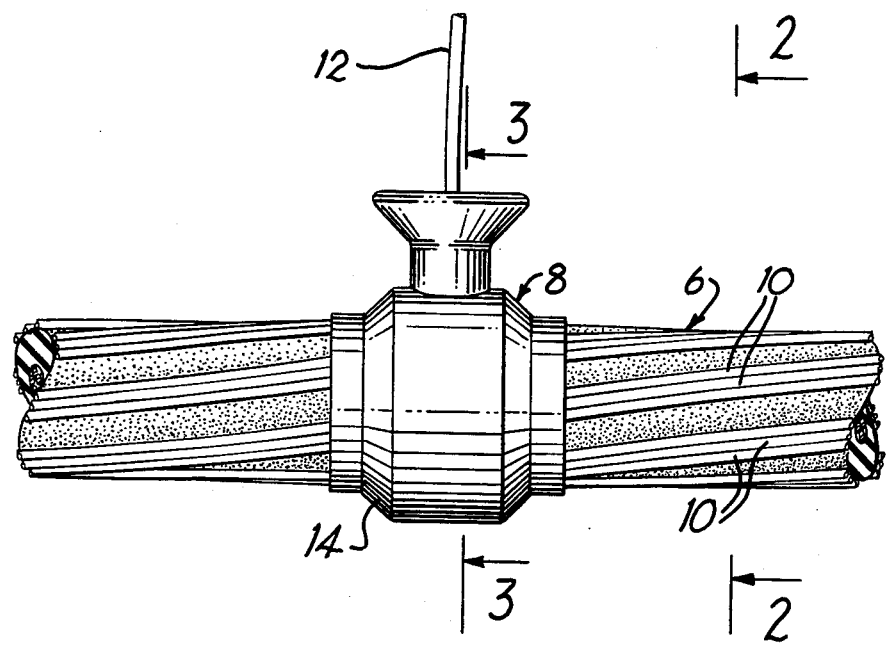
FIG. 1 is a side elevational view of a URD cable showing a low-melt casting surrounding the cable.
Figure 2:
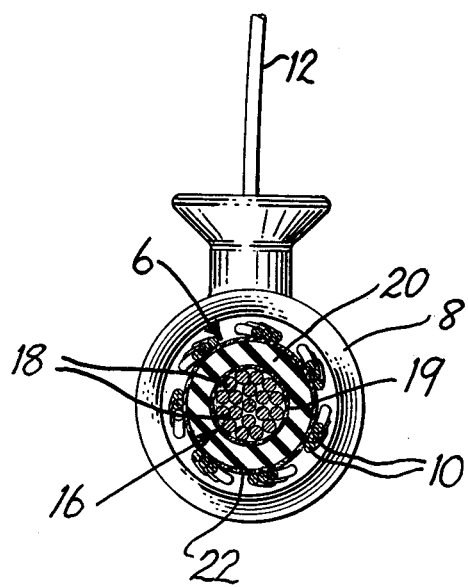
FIG. 2 is a view taken along lines 2—2 of FIG. 1 illustrating the URD cable within the surrounding low-melt alloy casting.

The present invention provides the means for a secure, long-lasting electrical connection between the concentric neutral wires of a URD cable and a sacrificial anode. Referring to FIGS. 1 and 2, a URD cable 6 is shown where a casting 8 of a low-melt alloy surrounds the cable and each of the otherwise exposed concentric neutral wires 10 to provide a secure electrical connection between the neutral wires 10 and a sacrificial anode (not shown) by means of an anode copper connecting wire 12. On the exterior of the casting 8 there may be provided a dielectric coating 14.

As shown more particularly in FIG. 2, the URD cable 6 has a central conductor core 16 made of aluminum or copper conductor wires 18 which core is covered by a relatively thin carbon filled polyethylene semiconductor 19. Surrounding this semiconductor 19 is a relatively thick polyethylene insulation 20 which is covered with a second relatively thin carbon filled polyethylene semiconductor 22. Then, the concentric neutral wires 10 are spirally applied around the carbon filled polyethylene semiconductor 22 and are connected by the copper connecting wire 12 to the sacrificial anode.

Figure 3:
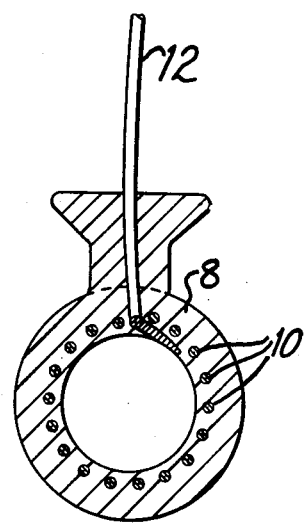
FIG. 3 is a view taken along lines 3—3 of FIG. 1 without the URD cable.

Referring to FIG. 3, the present invention, as illustrated, provides a low-melt alloy casting 8 which surrounds and envelopes each of the concentric neutral wires 10 and the anode connecting wire 12 at the area of contact between the neutral wires 10 and the connecting wire 12. The low-melt alloy casting 8 by surrounding this area of contact, secures a long-lasting electrical connection between the neutral wires 10 and the anode. Also, by this means, i.e. the low-melt alloy casting 8 around the URD cable, there is little, if any, opportunity for corrosion of further corrosion to occur to the neutral wires 10 for the life of the anode system.

The wires 18 which makeup the central conductor core 16 of the URD cable 6, may be made of any suitable conducting material such as copper or aluminum. The conductor wires 18 may be stranded into a tight core and as shown in FIG. 2, the wires are covered with a relatively thin carbon filled polyethylene semiconductor 19.

The insulation material 20 may be any suitable non-conducting material. For example, polyethylene has been used in practice.

The concentric neutral wires 10 may be bare or "tinned" copper wires. The neutral wires 10 are spirally applied around the URD cable 6 and the functions of the neutral wires 10 are to provide grounding for the cable 6 and to provide a return path for the current. A suitable ground for the URD cable 6 is necessary for the protection of personnel in the event the cable is damaged by a "dig in", and to minimize the possible damage or interference effects on nearby communications cables.

The neutral wires maintain a contact with the anode wire 12 that is connected to a sacrificial anode for protecting the URD cable 6 against corrosion. The sacrificial anode also serves as a ground for the cable. For purposes of grounding, the wire 12 may be connected to a ground rod positioned where the anode would normally be installed.

The low-melt alloy used for the casting 8 may be selected from many different alloys or individual metals which are suitable as a fusible alloy collar for the electrical connection of the neutral wires and anode according to the present invention. The low-melt alloys should as well as being castable have a casting temperature low enough so that the cable is not damaged during the process of molding the casting 8 around the cable 6, the neutral wires 10 and the anode connecting wire 12. And, the melting temperature of the fusible alloy should be high enough so that the collar, i.e. casting 8, does not melt from the heat generated within the URD cable 6 during normal or even temporary abnormal conditions. The heat generated from the cable may go as high a temperature of about 120° C. to 150° C. for a short period of time, e.g. 15-30 minutes. If an alloy has a slightly higher melting point than the maximum URD cable operating temperature, this will not present a problem since heat is withdrawn immediately from the alloy into thermally conductive mold during the molding process. If this loss or withdrawal of heat did not occur, there would be a possibility that the semiconducting material such as carbon filled polyethylene would become damaged or deteriorated.

Some of the typical low-melt alloys or metals that may be used as the casting 8 are listed below in Table I. The low-melt alloys comprise metals selected from the group consisting of Lead (Pb), Cadmium (Cd), Bismuth (Bi), Tin (Sn), Indium (In) and Antimony (Sb).

TABLE 1

| | Low-Melt Alloys and Metals for URD Casting | | | | | | | |
|---|---|---|---|---|---|---|---|---|
| | Melting Point | | Percentage of Metals | | | | | |
| Alloy | °C. | °F. | Pb | Cd | Bi | Sn | In | Sb |
| 1 | 327 | 621 | 100 | | | | | |
| 2 | 271 | 520 | | | 100 | | | |
| 3 | 232 | 449 | | | | 100 | | |
| 4 | 183 | 361 | 38 | | | 62 | | |
| 5 | 177 | 349 | | 32 | | 68 | | |
| 6 | 145 | 293 | 31 | 18 | | 51 | | |
| 7 | 138-170 | 281-338 | | | 40 | 60 | | |
| 8 | 138 | 281 | | | 57 | 43 | | |
| 9 | 124 | 255 | 45 | | 55 | | | |
| 10 | 123 | 253 | | 25 | | | 75 | |
| 11 | 117 | 243 | | | | 48 | 52 | |
| 12 | 109 | 228 | | | | 68 | | 32 |
| 13 | 103-227 | 217-440 | 28.5 | | | 48 | 14.5 | 9 |
| 14 | 103 | 217 | | 20 | | 54 | 26 | |
| — | 100 | 212 | BOILING POINT OF WATER | | | | | |
| 15 | 96 | 205 | 32 | | | 52 | 16 | |
| 16 | 70-88 | 158-190 | 37.7 | 8.5 | 42.5 | 11.3 | | |
| 17 | 70 | 158 | 26 | | | 52 | | 22 |
| 18 | 61 | 142 | | | | 33 | 16 | 51 |
| 19 | 58 | 136 | 18 | | | 49 | 12 | 21 |
| 20 | 47 | 117 | 23 | 5 | | 45 | 8 | 19 |

The low-melt alloy used for the casting 8, i.e. collar for the URD cable, is dictated by the operating temperature of the URD cable 6. As described above, the melting temperature of the fusible alloy should be high enough so that the casting 8 into which it is formed, does not melt from the heat generated within the URD cable during operating conditions.

Figure 4:
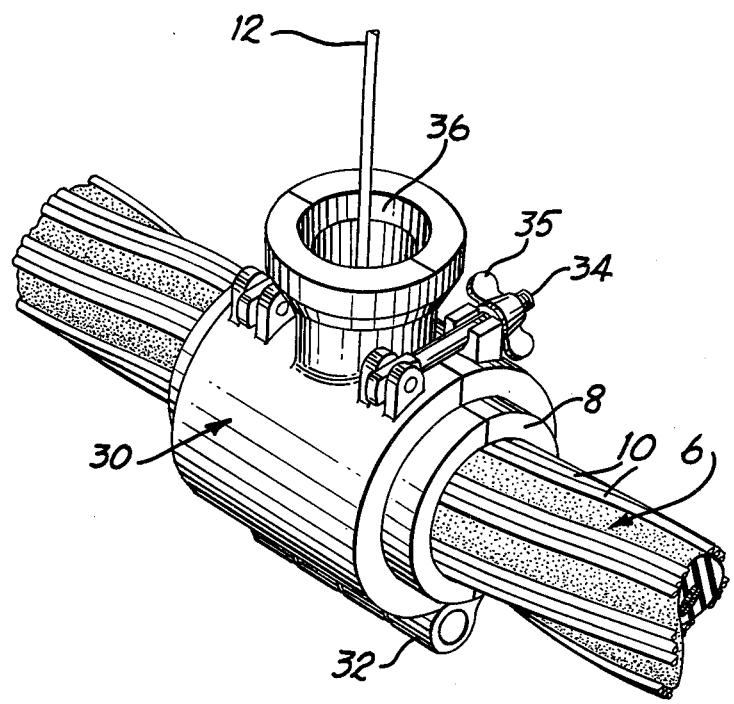
FIG. 4 is a perspective view of the mold secured around the URD cable.

According to the present invention, the low-melt alloy may be cast around the URD cable 6 when the cable 6 has already been installed in the ground for a period of time. In order to do this, a mold 30 (as illustrated in FIG. 4) is placed and secured around the URD cable 6 over the area of contact between the concentric neutral wires 10 and the anode connecting wire 12. The mold 30 can be made of a variety of materials including aluminum which have a high thermal conductivity.

Before the low-melt alloy can be placed in the mold 30 secured around the URD cable, the surfaces of the neutral wires 10 and the anode lead wire 12 must be cleaned at the area of contact between the neutral wires 10 and the cast collar which would include the area of contact with the anode wire 12. The cleaning may be done with wire brushes and/or chemicals such as a flux material to reduce the oxide and corrosion product build-up on the wires. After the concentric neutral wires 10 anode and connecting wire 12 have been cleaned, the mold 30 is opened at its hinges 32 and placed around the URD cleaned 6 over the area of contact between the concentric neutral wires 10 and anode connecting wire 12. Then the mold is closed and secured by the bolts 34 and nuts 35. With the mold secured, the low-melt alloy is poured through the opening 36 of the mold around the cable, the neutral wires and anode lead wire 12. The mold is left in place and the low-melt alloy is allowed to cool and solidify at ambient temperature. After the low-melt alloy has solidified the mold is removed, the collar may be coated with a high dielectric coating 14 and a secure, long-lasting electrical connection is provided between the concentric neutral wires 10 and the sacrificial anode.

The low-melt alloy is poured into the mold 30 to surround the URD cable 6 so as to contact at least 50% of the surface area of each of the neutral wires 10 and the anode wire 12 in the area of contact. The low-melt alloy as poured generally envelopes each of the neutral wires and anode wire 12.

Figure 5:
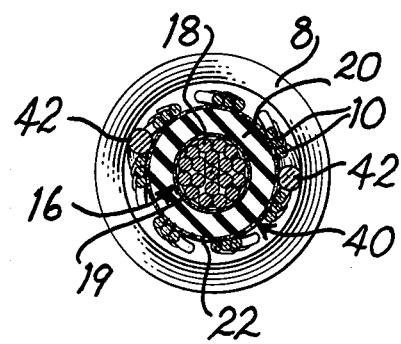
FIG. 5 is a view similar to that of FIG. 2, illustrating another embodiment of a URD cable according to the present invention.

Referring to FIG. 5, another embodiment of the URD cable 40 is constructed in the same manner as the URD cable 6 illustrated in FIG. 2. The only exception is that there is no anode connecting wire (i.e., wire 12) leading to a sacrificial anode. Instead, this URD cable 40 is provided with one or more anodes in the form of zinc base continuous wires 42. These continuous anode wires 42 extend the full length of the URD cable 40 and applied on the outside of the cable 40 in the same manner as the concentric neutral wires 10. The zinc base continuous wires 42 may be a solid zinc wire or preferably contain a centrally located small diameter copper carrier wire (not shown).

The casting 8 is molded around the cable 40 in the same manner as around the cable 6 described above. This embodiment (FIG. 5) of the continuous anode wires 42 is intended for use in the manufacture of new URD cables to provide a secure, long-lasting electrical connection between the neutral wires 10 and the anode wires 42. The embodiment of the URD cable illustrated in FIG. 2 is intended for use of providing a secure, long-lasting electrical connection between the neutral wires 10 and the anode in already installed URD cables as well as the new manufactured URD cables.

In this embodiment, as illustrated in FIG. 5, the URD cable 6 may include an extruded plastic jacket (not shown) surrounding the concentric neutral wires 10 and the anode wires 42. The plastic jacket surrounds the URD cable 6 and the wires (i.e. neutral wires 10 and anode wires 42) except for the portion of the area of contact between the wires which is surrounded by the low-melt alloy casting 8. This URD cable 6 (FIG. 5) may be grounded with a ground rod (not shown), as may the cable illustrated in FIG. 2.

In view of the above description of the present embodiments, it is clear that the present invention provides the means for a secure, long-lasting electrical connection between the concentric neutral wires of a URD cable and an anode. This is the case whether the anode is installed remote from the URD cable and connected by a wire 12 or a continuous anode as illustrated in FIG. 5.

The following example is provided to further illustrate the advantages of the present invention.

EXAMPLE

Fusible Alloy Collar on URD Cable

In order to support the use of different alloys and metals in the casting of the present URD collar, several alloys were cast around a URD cable. The temperature rise in the polyethylene insulation of the cable was measured during the casting of the various compositions of fusible alloy collars. These collars, i.e. castings, as described above, were for use as a means of providing a stable electrical connection between each of the concentric neutral wires and the anode connecting wire, and thus, the sacrificial anode. The alloys used in the tests were:

Tin (Sn);
Tin (Sn) and Lead (Pb);
Bismuth (Bi) and Lead (Pb);
Bismuth (Bi), Tin (Sn) and Cadmium (Cd);
Bismuth (Bi), Lead (Pb), Tin (Sn) and Cadmium (Cd); and
Bismuth (Bi), Lead (Pb), Tin (Sn) and Cadmium (Cd).

The requirements of the alloys used, beyond reasonable castability, were that the casting temperature be low enough so that the cable would not be damaged in the process and that the melting point be high enough so that the collar would not melt from heat generated within the cable during normal or even temporary abnormal conditions. The severest case would occur during an emergency overload situation in which the conductor is allowed to reach 130° C. (266° F.) for as long as 5 hours. This would mean a cable surface temperature of about 115° C. (239° F.). This would be a very unusual circumstance for most URD applications.

The alloys were tested with solidus temperatures ranging from 70° C. to 232° C. The castings were made into an aluminum mold fitted around samples of standard URD cable. A thermocouple was placed in the URD cable about 1 mm below the outside surface. All castings were poured at 10° C. above the normal alloy liquidus temperature. Composition of the alloys, liquidus and solidus temperature and maximum temperature recorded in the cable are listed below in Table II. It can be seen from the table that although there is some scatter in the results there is a general, moderate increase in cable temperature with increasing alloy melting point. In no case did the cable temperature approach the maximum operating temperature. of the URD cable.

In light of these results, all of the alloys in Table II may be used as a URD collar, and no danger to the cable is foreseen by the application of fusible alloy collars cast into the high conductivity (aluminum) molds. The results of the testing are provided below in Table II:

TABLE II

| Alloy Composition | Fusible Alloy Cast Collars | | |
|---|---|---|---|
| | Solidus Temp. | Liquidus Temp. | Max. Cable Temp. |
| 100% Sn | 232° C. (449° F.) | same | 50.5° C. (123° F.) |
| 62% Sn-38% Pb | 183° C. (361° F,) | same | 50° C. (122° F.) |
| 55% Bi-45% Pb | 124° C. (255° F.) | same | 34° C. (102° F.) |
| 54% Bi-26% Sn-20% Cd | 103° C. (217° F.) | same | 41.5° C. (107° F.) |
| 42.5% Bi-37.7% Pb-11.3% Sn-8.5% Cd | 70° C. (158° F.) | 88° C. (190° F.) | 36.5° C. (97° F.) |
| 50% Bi-27% Pb-13% Sn-10% Cd | 70° C. (158° F.) | same | 38.9° C. (101° F.) |

We calim:

1. A method of providing a secure, long-lasting electrical connection between the concentric neutral wires of a URD cable and a sacrificial anode having a connecting wire in contact with the neutral wires, said method comprising:
    (a) securing a mold around said URD cable and the concentric neutral wires over said area of contact with said anode connecting wire;
    (b) pouring a low-melt alloy into said mold to surround the URD cable so as to contact at least 50% of the surface area of each of said neutral wires and said anode connecting wire in said area of contact; and
    (c) cooling said low-melt alloy to form a solid casting around said concentric neutral wires in the area of contact with said anode connecting wire, whereby a secure, long-lasting electrical connection is provided between said neutral wires and said anode.

2. In a process according to claim 1, wherein the low-melt alloy comprises metals selected from the group consisting of lead, cadmium, bismuth, tin, indium and antimony.

3. In a method according to claim 1, wherein the melting temperature of said low-melt alloy is lower than the URD cable maximum operating temperature.

4. In a method according to claim 1, wherein the melting temperature of the low-melt alloy is higher than the URD cable maximum operating temperature.

5. In a method according to claim 1, wherein the low-melt alloy is cooled at ambient temperature.

6. In a method according to claim 1, wherein before said mold is secured, the surfaces of said concentric neutral wires and anode connecting wire are cleaned at the area of contact of said neutral wires with said connecting wire around said URD cable.

7. In a URD cable comprising a central internal core, a semi-conductor material surrounding said core, an insulation material surrounding said semi-conductor material and surrounded by a second semi-conductor material, and a series of concentric neutral wires spirally applied around said second semi-conductor material and in contact with an anode connecting wire, the improvement comprising a casting of a low-melt alloy surrounding the URD cable over the area of contact between said neutral wires and said anode connecting wire so as to contact at least 50% of the surface area of each of said neutral wires and said connecting wire whereby a secure, long-lasting electrical connection is provided between said neutral wires and said anode.

8. In the improved URD cable according to claim 7, wherein the low-melt alloy comprises metals selected from the group consisting of lead, cadmium, bismuth, tin, indium and antimony.

9. In the improved URD cable according to claim 7, wherein the melting temperature of said low-melt alloy is lower than the maximum URD cable operating temperature.

10. In the improved URD cable according to claim 7, wherein the melting temperature of the low-melt alloy is higher than the maximum URD cable operating temperature.

11. A URD cable comprising:
    (a) a conductor core consisting of conducting wires;
    (b) a first relatively thin semi-conductor covering said conductor core;
    (c) a relatively thick insulation surrounding said first semi-conductor;
    (d) a second relatively thin semi-conductor covering said insulation;
    (e) a series of concentric neutral wires with at least one zinc base continuous anode wire wound around said second semi-conductor; and
    (f) a low-melt alloy casting surrounding a portion of the area of contact between said neutral wires and said anode wire to provide a long-lasting electrical connection between said neutral wires and said zinc anode wire.

12. A URD cable according to claim 11, where there is included an extruded plastic jacket surrounding said neutral wires and said zinc anode wire except where said low-melt alloy casting surrounds said wires.

13. A URD cable according to claim 11, wherein said neutral wires and said anode wire extend the full length of the cable and said low-melt alloy casting surrounds said wires so as to contact at least 50% of the area of each of said neutral wires and said anode wire.

14. A URD cable according to claim 11, wherein said conducting wires are copper or aluminum.

15. A URD cable according to claim 11, wherein said first and second semi-conductors are carbon filled polyethylene.

16. A URD cable according to claim 11, wherein said insulation is polyethylene.

17. A URD cable according to claim 11, wherein said zinc base continuous anode wire has a centrally located small diameter copper wire.

18. A URD cable according to claim 11, wherein said low-melt alloy comprises metals selected from the group consisting of lead, cadmium, bismuth, tin, indium and antimony.

19. A URD cable according to claim 11, wherein the melting temperature of said low-melt alloy is lower than the maximum URD cable operating temperature.

20. A URD cable according to claim 11, wherein the melting temperature of the low-melt alloy is higher than the maximum URD cable operating temperature.

* * * * *